Patented June 23, 1936

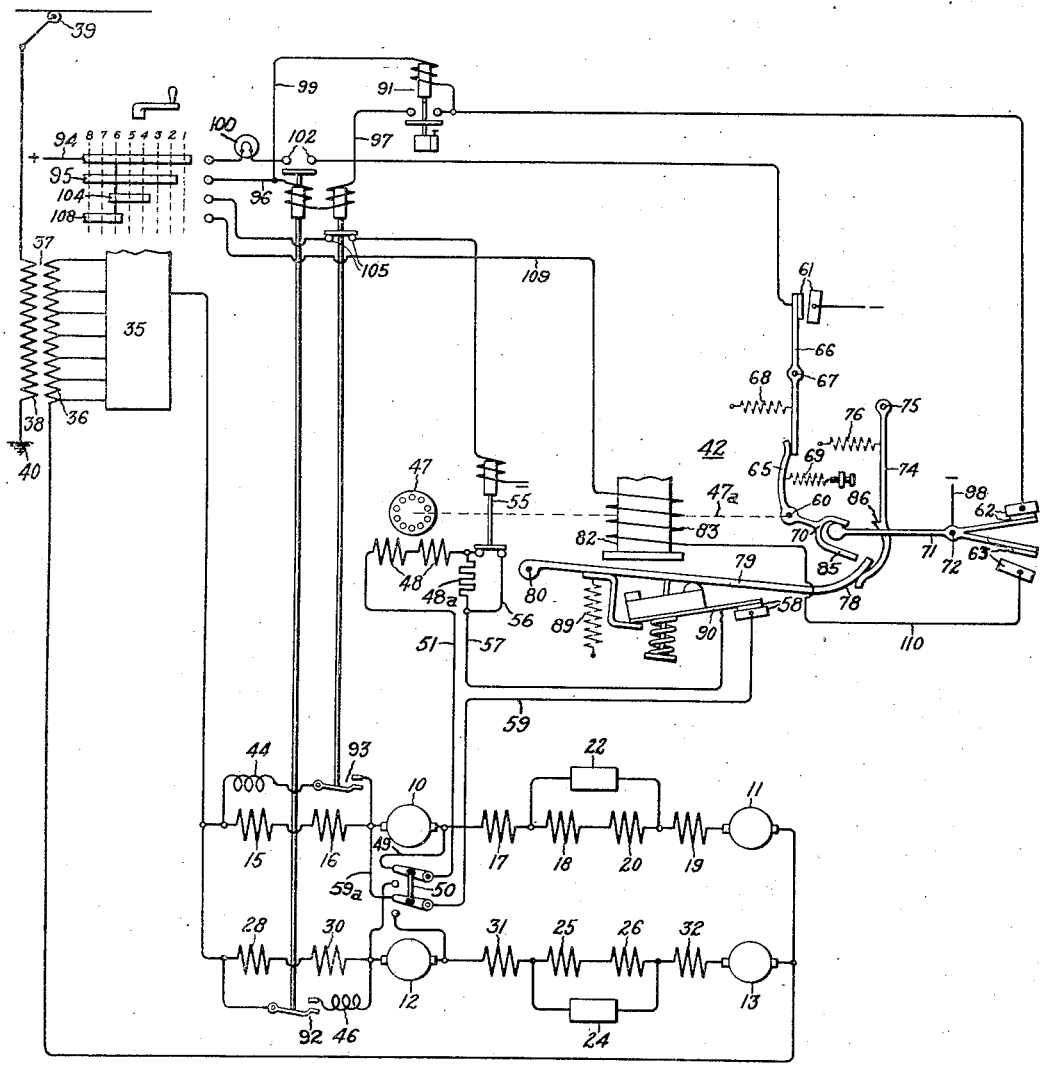

2,045,485

UNITED STATES PATENT OFFICE 2,045,485

CONTROL SYSTEM

Harold S. Ogden and John J. Casby, Erie, Pa., assignors to General Electric Company, a corporation of New York Application July 13, 1933, Serial No. 680,228

13 Claims. (Cl. 172—179)

Our invention relates to control systems for single phase motors of the commutator type, more particularly to an armature voltage responsive relay arranged to control the excitation of the exciting field windings of the motors, and has for an object the provision of a simple and inexpensive system of this character which protects the relay at all times against over-voltage.

For satisfactory operation of single phase traction motors of the commutator type, it has been found desirable to improve the commutation by accelerating the motors from standstill to a predetermined speed on reduced field. If this is not done arcing at the brushes will occur and the commutators might be overheated to such a degree as to cause considerable damage.

Heretofore it has been proposed to utilize the change in armature voltage as a rough indication of the speed of the motor. However, much is yet to be desired in a relay which will perform its controlling functions properly even though subjected to a wide range of voltages, i. e., from zero to 300 volts or more. For example, the relay must effectuate an increase in field excitation with the armature voltage at a relatively low value, of the order of 50 volts. It will, therefore, be seen that it is not economical to design a relay which will pick up at approximately 50 volts and have it capable of withstanding 300 volts. The problem is further complicated because the characteristics of motors of the commutator type are such that when the changeover is made from reduced field to full field the armature voltage is immediately increased approximately 40%. This change of voltage must be taken into account because the relay must be arranged to reduce the field excitation when the locomotive is decelerated at approximately the same motor speed as before. Furthermore, since the transfer from reduced field to full field causes a substantial increase in the torque of the motor, it is desirable to correlate the operation of the controller with the operation of the relay so that the engineman can maintain a smooth rate of acceleration. Accordingly, it is a further object of our invention to provide a voltage relay which will accurately control the excitation of the exciting field winding under all conditions of operation and which will signal to the engineman that the operation of the relay is about to take place.

In carrying out our invention in one form thereof, we provide an armature voltage relay for controlling the field strength of the exciting field windings so that full field is obtained above a predetermined speed and reduced field is obtained below a predetermined speed with means for protecting the relay at all times against excess voltage. More specifically, we provide a relay responsive to a given value of armature voltage to effectuate the transfer from reduced field to full field and which is responsive to a different value of voltage in transferring from full field to reduced field. Signalling means are provided to inform the engineman that the relay is about to operate so that he can operate his controller independently of the relay to maintain a substantially constant rate of acceleration of the motors. Furthermore, if power is reapplied to the motors while they are rotating at a given speed, a sufficient time elapses before the relay is effective to permit it to find a position corresponding to the speed of the motors.

For a more complete understanding, reference should now be had to the drawing wherein our invention is illustrated diagrammatically.

It is believed that a clear understanding of the arrangement and operation of the various parts of the system will be better understood from a complete description of the operation of the system as a whole. Therefore, the construction and arrangement of certain of the devices only will be first described in detail.

Referring now to the drawing, we have shown our invention in one form as applied to single phase, alternating current commutator motors 10 to 13, inclusive. The motors 10 and 11 are provided with series exciting field windings 15 and 16 connected on the controller side of the armature of the motor 10. This motor is provided with a series compensating field winding 17 and a series interpole field winding 18. Similarly, the motor 11 is provided with a series compensating field winding 19 and a series interpole field winding 20. In order to insure the correct phase relations and magnitudes of the currents on the interpole field windings 18 and 20, a control device 22 serves automatically to control the connections of resistances and reactors (not shown). Similarly, a control device 24 connected in shunt relation with the interpole field windings 25 and 26 of the motors 12 and 13 controls the phase relations and magnitudes of the currents of these interpole field windings for the best commutating conditions. The motors 12 and 13 are also provided with exciting field windings 28 and 30 and compensating field windings 31 and 32.

In order to accelerate the traction motors 10 to 13, inclusive, a controller 35, shown as a conventional drum type controller, serves to vary the connections of the secondary winding of a power transformer 37. The primary winding 38 of this transformer is connected to the trolley 39 and to ground 40. During the initial acceleration of the traction motors reduced field is maintained on the exciting field winding. An armature voltage relay 42 is connected so as to cause circuit connections to be completed across the respective pairs of exciting field windings 15, 16 and 28, 30, through a reactor 44, being associated with the field windings 15 and 16, and through a reactor 46 being associated with the field windings 28 and 30. The relay operating element consists of a single phase, shaded pole induction motor provided with a rotor 47 and field windings 48. The field windings 48 are connected in shunt circuit relation with the armature of the traction motor 10. This circuit may be traced from one side of the armature by conductor 49, double pole switch 50, conductor 51, windings 48, contacts of relay 55, conductors 56 and 57, relay contacts 58, conductor 59, double pole switch 50 and by conductor 59a to the other side of the armature of motor 10.

It will be observed that the contacts of the relay 55 normally short circuit a resistance 48a which is arranged to be connected in circuit with the field windings 48. The rotor 47 is provided with an operating shaft 47a indicated by the broken line, which shaft is connected to an operating yoke 60. By means of the operating yoke selective operation is obtained with respect to the contacts 61, whereby contacts 61 are first closed by the counter-clockwise rotation of the yoke 60. For further movement of the yoke the contacts 62 are opened while the contacts 63 are closed.

The closing of the contacts 61 is accomplished by reason of the counter-clockwise rotation of the arm 65 secured to the yoke, this arm freeing a contact-carrying member 66 for rotation about its pivot 67 in accordance with the bias exerted upon it by a spring 68. The movement of the yoke 60 is opposed by an adjustable spring 69. Some time after the contacts 61 are closed, i. e., after the armature voltage increases a predetermined amount to cause additional rotation of the relay, an operating arm 70 provided on the yoke 60 rotates a contact-carrying arm 71 about its pivot point 72 in a direction to open the contacts 62 and to close the contacts 63. At this time the end 85 of the operating yoke 60 is just above a shoulder 86 provided on a latching member 74. This latching member, pivotally mounted at its upper end 75, is biased by a spring 76 for rotation in a clockwise direction. However, the member 74 is restrained from its normal clockwise rotation by a stop 78 formed by an end portion of an armature 79 mounted on a pivot pin 80. A magnet coil 83, wound about a core 82, when energized, operates the armature 79 to an attracted position thereby freeing the latching member for movement into engagement with the end 85 of the yoke 60. As soon as the operating coil 83 is deenergized, a spring 89 operates the armature to its unattracted position, the end 78 of the armature 79 serving to unlatch the relay by its engagement with the latching member 74.

The armature 79 also serves to open and close the contacts 58 by means of a contact arm 90 resiliently mounted on the armature 79. Inasmuch as the armature 79 must be operated to the attracted position before the relay is latched into its energized position, it will be observed that the contacts 58 are opened after the contacts 63 are closed. Consequently, the windings 48 are deenergized at the same time that the relay is latched into position. The windings 48, however, are again energized before the contacts 63 are opened since the yoke 60 and the operating element of the relay are not released for movement until after the coil 83 has been deenergized to permit the return of the armature 79 to its unattracted position.

With the above understanding of the elements and their organization with respect to each other in the system, the operation of the system itself and the manner in which the armature voltage relay 42 controls the excitation of the exciting field windings 15, 16 and 28, 30 will be readily understood from the description which follows. In the operation of the invention it will be assumed that the supply lines are energized as indicated by the well understood symbols and that the controller 35 is operated to its first position to apply a relatively low voltage to the motors 10 to 13, inclusive. In the first accelerating notch or position of the controller, the exciting field windings 15, 16 and 28, 30 produce full field excitation on their respective motors as conductor 96 is not yet energized by segment 95 of the controller. At this time the motor current is relatively low so that reduced field operation is not essential. In the second accelerating position, a time delay relay 91 is energized and after a predetermined time interval operates to energize the operating coils of the field controlling switches 92 and 93 through a circuit which may be traced from the positive source of supply 94, segment 95 of the controller 35, conductor 96 operating coils of the switches 92 and 93, conductor 97, contacts of relay 91, contacts 62 of relay 42 and by contact member 71 to the negative source of supply 98. Consequent to the closing of switches 92 and 93 the reactors 44 and 46 are connected in shunt relation with their respective field windings 15, 16 and 28, 30. The motors 10 to 13, inclusive, are therefore accelerated on reduced field under the control of the relay. It will, of course, be understood that reduced field operation can be obtained in the first accelerating position by rearranging the circuits.

As we have stated, full excitation of the field windings is to be reestablished as soon as the armature voltage has reached a predetermined value, for example 52 volts. The load on the motors will of course affect the armature voltage to some extent so that this voltage, or corresponding motor speed, may be reached with the controller in one of its lower accelerating positions. Accordingly, the spring 69 is adjusted so that at about 45 volts the rotor 47 begins to rotate the yoke 60 in a counter-clockwise direction and will rotate the yoke 60 sufficiently at this time to close the contacts 61. A signal lamp 100 located in the cab of the locomotive is thereby energized and warns the engineman that the change-over from weak field to full field is about to take place. It is contemplated that he shall not operate the controller to higher notches or positions until full field is obtained as indicated by the light 100 being extinguished. This signal is quite important because if the increased tractive effort due to the change in field should be combined with the increased tractive effort of an additional notch it might slip the wheels or trip the overload relays.

Continuing with the operation of our invention, as soon as the armature voltage is approximately 52 volts the rotor 47 will have operated an amount sufficient to open the contacts 62 thereby interrupting the energizing circuit for the operating coils of the field controlling switches 92 and 93. The opening of these switches reestablishes full field excitation of the exciting field windings 15, 16 and 28, 30. The indicating lamp 100 is extinguished by the opening of the contact 102 operated with the switch 92.

The contacts 63 of the relay are closed as the contacts 62 are opened to complete partially an energizing circuit for the operating or locking coil 83 of the relay.

If the controller 35 occupies a position below the sixth notch the locking coil 83 is not energized. However, the motor windings 48 continue to be energized at a safe value and hold the relay in the operated position. The selection of the sixth accelerating position for the energization of the coil 83 is made with reference to the armature voltage applied to the relay windings 48. In the form of the invention shown an excessive voltage is never applied to the windings 48 so long as the controller is not operated above the sixth position. As soon as the sixth position is reached the windings 48 are disconnected from the motor armature thereby protecting the relay from the high voltage existing across the armature during the subsequent acceleration of the motors.

Continuing with the operation of our invention, it will be assumed that the controller has been operated to the sixth accelerating notch thereby energizing the coil 83 through a circuit which may be traced from the positive source of supply 94, segment 108 of controller 35, conductor 109, coil 83, conductor 110, contacts 63 and to the negative source of supply 98. The magnet coil 83 thereupon operates the armature 79 to its attracted position, the movement of the end 78 of the armature 79 releasing the latching member 74 for movement in accordance with the bias of its spring 76. The end 78 of the armature 79 also engages the end 85 of the yoke 60 and forces the yoke in the counter-clockwise direction thereby insuring that the latch 86 will definitely engage with the end 85 of the arm 70. The relay is thereby positively latched into its operated position during all further movement of the controller toward higher accelerating positions.

As we have stated the armature 79 also opens the contacts 58 to remove the voltage from the windings 48 of the operating element of the relay thereby protecting the relay windings from the high voltage which exists during the high speed operation of the motors 10 to 13, inclusive. Since the relay is now locked into position it will be further observed that reduced field operation cannot again be obtained by any forward or backward movement of the controller above the sixth accelerating notch.

However, as soon as the controller has been returned to the sixth notch the relay drop-out voltage is raised by reason of the energization of the operating coil of the switch 55, this circuit being completed through segment 104 and contacts 105 of switch 93. The switch 55 thereupon operates to remove the short circuit across the resistance 48a. The value of this resistance is determined by the increase of voltage which takes place when the transfer from reduced field to full field is made so that the relay will operate when the controller is moved to position 5 to reduce the field excitation of the exciting windings of the traction motors at approximately the same speed required for the transfer from reduced field to full field.

Assuming now that the controller occupies the fifth position, it will be observed that the energizing circuit for the locking coil 83 is opened and the armature 79 is immediately operated to the position shown in the drawing, the end 78 of the armature 79 releasing the latching member 74 so that the relay is free to return to its original position. However, the contacts 58 are closed, as soon as the coil 83 is deenergized, to connect the windings 48 of the induction motor across the armature of the traction motor 10. If sufficient voltage is thereby applied to field windings 48, the rotor 47 is energized to hold the relay in its energized position, so that the locomotive continues to operate at full field. However, as soon as the voltage falls low enough to cause the relay to return to its deenergized position, contacts 61 and 62 are closed while the contacts 63 are opened. Consequent to the closing of the contacts 62 the energizing circuit for the operating coils of the switches 92 and 93 and of the relay 91 is reestablished and these switches are thereby operated to complete the shunting circuit on the exciting field windings of the traction motors thereby completing the transfer from full field to reduced field.

As soon as the switches 92 and 93 have been operated to re-establish reduced field on the field windings of the traction motors, it will be observed that the interlock contacts 105 provided on the switch 93 are opened, thereby preventing subsequent energization of the operating coil of the switch 55 until after the relay 42 has been operated to re-establish full field excitation on the traction motors. Therefore, the traction motors can again be accelerated from either the second or the third controller position with the relay operating to re-establish full field excitation as soon as the voltage across the armature 10 again approaches the predetermined value, for example the assumed value of 52 volts.

If the controller is moved to the third notch before the relay effects the transfer from full field to reduced field, it will be observed that the segment 104 occupies a position such as to prevent the energization of the switch 55, and the consequent insertion of the resistance 48a in the relay field winding circuit. Under these conditions the relay does not operate to cause the transfer from full field operation to reduced field operation until the speed of the traction motors has been reduced substantially below the speed at which the transfer from reduced field to full field takes place. If the resistance 48a had not been excluded for notches 2 and 3, the drop-out value of the relay would be too high and would cause the relay to oscillate between its positions under certain conditions of operation.

It will now be assumed that the motors are rotating at a given speed without power, i. e. coasting with the controller in its off position, and the operator advances the master controller to the higher accelerating notches. The relay 42 is free to take a position depending upon the voltage across the armature. If the armature voltage is such that the relay 42 will assume its energized position it will be understood that a short time interval will be required for the operating element and yoke 60 of the relay to move from the deenergized to the energized position. Consequently, in order to prevent the operation of the switches 92 and 93 during this time interval, the time relay 91 introduces a corresponding delay before these switches can be energized. This time delay is of the order of from one to two seconds. If this provision were not made the switches 92 and 93 would close and then immediately open resulting in possible injury to the commutators due to sparking. It will, therefore, be seen that correct operation of the relay 42 is obtained so that the motors operate at all times with reduced field on the motors below, and full field above, a predetermined speed.

While we have shown a particular embodiment of our invention, it will be understood, of course, that we do not wish to be limited thereto since many modifications may be made, and we, therefore, contemplate by the appended claims to cover any such modifications as fall within the true spirit and scope of our invention.

What we claim as new and desire to secure by Letters Patent of the United States, is:

1. The combination with a traction motor provided with an exciting field winding and an armature winding, a controller operable through a plurality of accelerating positions for accelerating said traction motor, of means responsive to the operation of said controller for initially accelerating said traction motor on reduced field, a relay responsive to the voltage across said armature winding of said traction motor for increasing the excitation of said field winding, and means responsive to the operation of said relay for disconnecting said relay from said armature winding thereby preventing injury to said relay due to the voltage existing across said armature winding during subsequent acceleration of said motor.

2. The combination with a traction motor provided with an exciting field winding and an armature winding, a controller operable through a plurality of accelerating positions for accelerating said traction motor, of means responsive to the operation of said controller for initially accelerating said traction motor on reduced field, a relay responsive to the voltage across said armature winding of said traction motor for increasing the excitation of said field winding, and means responsive to the operation of said relay for latching said relay into its field increasing position and for disconnecting said relay from said armature winding thereby preventing injury to said relay due to the voltage existing across said armature winding during subsequent acceleration of said motor.

3. A control system comprising a single-phase series motor of the commutator type, a controller operable through a plurality of accelerating positions for accelerating said motor, an exciting field winding for said motor, field shunting means for reducing the excitation of said exciting field winding, a relay provided with operating windings connected so as to be energized in response to the armature voltage of said motor, connections for connecting said field shunting means to said controller for producing reduced field excitation on said motor, means operated by said relay for operating said field shunting to produce full field excitation on said motor in response to an armature voltage corresponding to a predetermined speed of said motor, and means responsive to the operation of said relay for increasing the resistance of said relay winding circuit so that said relay will operate at substantially the same speed to reestablish said deduced field excitation on said traction motor.

4. In combination, single-phase series motors of the commutator type, a controlled operable through a plurality of accelerating positions for controlling the energization of said motors, exciting field windings for said motors, field shunting means for controlling the energization of said field windings for operation on reduced field and full field, an armature voltage relay provided with an operating element consisting of a single phase, shaded pole induction motor, connections for energizing said induction motor in response to the voltage across the armature of said series motor, normally closed relay contacts in circuit with said relay field windings, means responsive to the operation of said controller for operating said field shunting means to produce reduced field excitation on said exciting field windings, and means responsive to the operation of said relay from one position to a second position for operating said field shunting means to produce full field excitation on said exciting field windings and to operate said relay contacts to said open circuit position to disconnect said relay windings from said armature thereby protecting said relay from overvoltage during subsequent acceleration of said traction motor, and means for latching said relay in said second position.

5. In combination, single-phase series traction motors of the commutator type provided with exciting field windings, a controller operable through a plurality of accelerating positions for controlling the energization of said motors, field shunting means operable between predetermined positions for producing reduced and full field excitation of said exciting field windings, a relay provided with an operating winding responsive to the armature voltage of said motors, relay contacts connected in circuit with said operating winding, latching means for said relay for latching the same in a predetermined position, means normally preventing operation of said latching means until said controller has been operated to a predetermined accelerating position, means operable by said controller for operating said field shunting means to produce reduced field excitation on said field windings, said relay, in response to a predetermined armature voltage, thereafter operating said field shunting means to said other position for full field excitation of said field windings, said latching means thereafter locking said relay in position with said relay contacts in the open position, and signalling means operable by said relay for indicating when said field winding is to be connected for full field operation from reduced field.

6. In combination, a control system comprising single-phase series traction motors of the commutator type, a controller operable through a plurality of accelerating positions for controlling the energization of said traction motors, field shunting means responsive to the operation of said controller for connecting said exciting field windings for reduced field operation, a relay provided with an operating winding connected to be responsive to the armature voltage of said motors, means operable by said relay for controlling said field shunting means to reestablish full field excitation on said exciting field windings when the voltage of said traction motors approaches a predetermined value, means responsive to the operation of said field shunting means and to the position of said controller for increasing the resistance of said relay winding circuit, latching means for locking said relay in its operated position, and means responsive to the position of said controller for controlling said latching means so that said latching means is operated only when said controller occupies a predetermined position.

7. A control system comprising a single-phase series motor of the commutator type provided with an exciting field winding, a controller operable through a plurality of accelerating positions for accelerating said motor, field shunting means for reducing the excitation of said exciting field winding, a relay responsive to the armature voltage of said motor for controlling the operation of said field shunting means in accordance with the speed of said motor, and timing means operable in accordance with the position of said controller for preventing operation of said field shunting means by said relay until the expiration of a predetermined time interval.

8. A control system comprising a single-phase series motor of the commutator type provided with an exciting field winding, a controller operable through a plurality of accelerating positions for accelerating said motor, field shunting means for reducing the excitation of said field winding, a relay responsive to the armature voltage of said motor for controlling the operation of said field shunting means in accordance with the speed of said motor, and means for preventing operation of said relay in the event said controller is operated to its off position and to a predetermined accelerating position while said motor is rotating at a given speed comprising a time delay relay for connecting said field shunting means to said relay a predetermined time interval after said controller has been returned to a predetermined accelerating position.

9. A control system comprising a single-phase motor of the commutator type provided with an exciting field winding, a controller operable through a plurality of accelerating notches for accelerating said motor, field shunting means for controlling the excitation of said field winding, a relay responsive to the armature voltage of said motor for controllling the the operation of said relay in accordance with motor speed, and means for preventing repeated operation of said relay due to the change in armature voltage incident to the variation in said field excitation comprising a resistor for controlling voltage setting of said relay, and means operable in accordance with the position of said controller for controlling said resistor.

10. In combination, a control system comprising single-phase series traction motors provided with exciting field windings, a controller operable through a plurality of accelerating notches for controlling the energization of said traction motors, field shunting means for producing reduced field operation of said motors, a relay provided with an operating winding connected to be responsive to the armature voltage of said motors, and a timing relay operable in accordance with the position of said controller for connecting said field shunting means in circuit with said relay.

11. The combination with a traction motor provided with an exciting field winding and an armature winding, control means for initially accelerating said motor on reduced field, a relay provided with an operating winding responsive to the voltage across said armature winding and operable from one position to a second position for controlling said control means to increase the excitation of said field winding, latching means for said relay, a locking coil responsive to the operation of said relay for controlling said latching means to lock said relay in said second position, and means operable by said locking coil for deenergizing said relay operating winding.

12. The combination with a traction motor provided with a series exciting field winding and a series armature winding, control means for controlling the energization of said exciting field winding for operation on reduced field and full field, means for operating said control means for reduced field operation, a relay provided with an operating winding responsive to the voltage across said armature winding and operable from one position to a second position for controlling said control means to produce full field excitation of said field windings, latching means for said relay, a locking coil provided with an armature for controlling said latching means to lock said relay in said second position, said armature being operatively connected to said relay to assist in holding said relay in said second position as said latching means operates to lock said relay, armature biasing means for operating said armature to render said latching means ineffective upon deenergization of said locking coil, and circuit controlling means operable by said armature for controlling the energization of said relay operating winding.

13. A control system comprising single-phase alternating-current motors of the commutator type provided with exciting field windings, field shunting means operable between predetermined positions for connecting said exciting field windings for operation on reduced and full field, a relay provided with an operating winding connected in shunt circuit relation with the armature of one of said motors for operating said relay substantially in accordance with the speed of said motor, means operable by said controller for operating said field shunting means to produce reduced field excitation on said motors, means operable by said relay for producing full field excitation on said motors when said motors are operated at a predetermined speed, signaling means responsive to initial movement of said relay for signaling that the transfer from reduced field to full field is about to take place and for signaling that said transfer has taken place, latching means for said relay, means operable in accordance with the position of said controller for controlling said latching means to permit said latching means to lock said relay in its operated position after said controller has been operated to a predetermined position, means operable by said aforementioned means for deenergizing said relay winding thereby preventing the application of over-voltage to said relay winding during subsequent acceleration of said motors, and means responsive to the position of said controller and to said field shunting means when in said full field position for increasing the resistance of said relay winding circuit whereby said relay operates to return said field shunting means to said reduced field position at approximately the same speed that the transfer was made from reduced field to full field.

HAROLD S. OGDEN.
JOHN J. CASBY.